INVENTOR.
MERRITT W. WOLFE
ATTORNEY

July 22, 1958 M. W. WOLFE 2,843,877
PORTABLE TIRE REPAIR APPARATUS
Filed Sept. 26, 1955 2 Sheets-Sheet 2

*INVENTOR.*
MERRITT W. WOLFE
BY
*R. L. Miller*
ATTORNEY

United States Patent Office 2,843,877
Patented July 22, 1958

2,843,877

PORTABLE TIRE REPAIR APPARATUS

Merritt W. Wolfe, Akron, Ohio, assignor to The Goodyear Tire & Rubber Company, Akron, Ohio, a corporation of Ohio Application September 26, 1955, Serial No. 536,689

14 Claims. (Cl. 18—18)

This invention relates generally to an apparatus for the repair of tires and more particularly to a portable apparatus for the repair by spot vulcanization of pneumatic tires without removal from the vehicle.

Tires, such as are commonly used on heavy vehicles designed especially for construction projects and on certain transportation vehicles such as aircraft and the like, frequently suffer injuries which normally do not prevent the continued use of the tire since the tire strength is only slightly affected. In many instances, removal of the tire is undesirable in view of difficulty of manipulating large tires off and on the vehicle. Furthermore, it is undesirable to immobilize the vehicle while tires are removed and repaired. This is especially applicable to such vehicles as aircraft which operate on tight operating schedules and where delays are exasperating and costly.

The general object of this invention is to provide an apparatus for the repair of a tire by vulcanization while mounted on a vehicle.

A further object is to provide an apparatus to effect such repairs in a speedy, simple, and efficient manner at the location whereat the vehicle is in use.

A still further object is to provide an apparatus to effect such repairs on a wide range and variety of tire sizes.

Other objects and advantages of this invention will become apparent hereinafter as the description thereof proceeds; the novel features, arrangements, and combinations being clearly pointed out in the specification, as well as in the claims thereunto appended.

Figure 1:
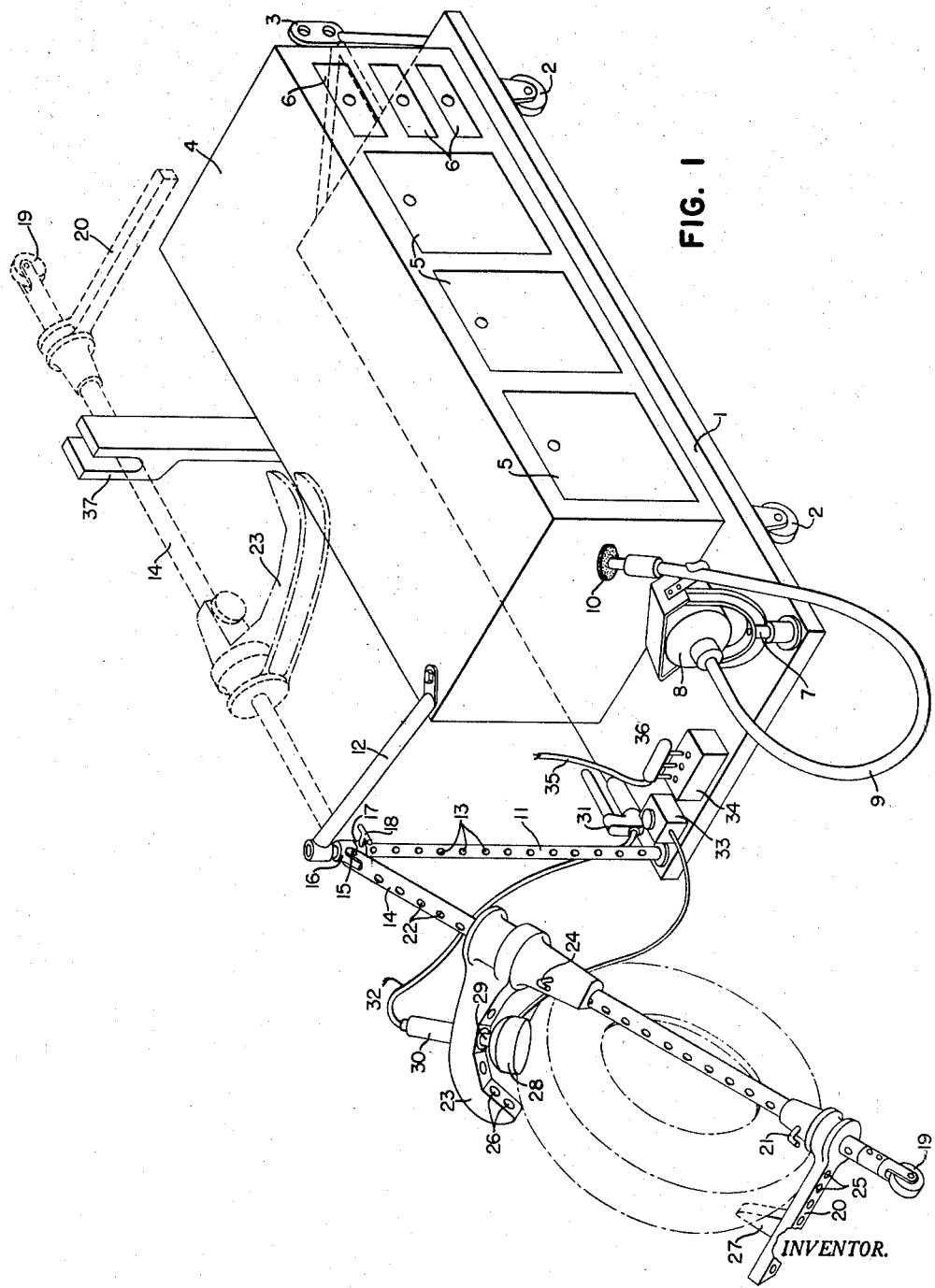
Fig. 1 is an isometric view of the apparatus of the invention.

In Fig. 1 the invention is shown applied to a trailer although it could also be applied to a truck body or other movable support. A horiontzal base platform 1 is mounted on wheels 2 for mobility and a hitch 3, attached to one end of the trailer platform 1, is used for positioning and ease of transportation. Affixed to the upper surface of the platform 1 is a storage box 4 having suitably arranged access panels 5 and drawers 6 therein for auxiliary equipment in order to provide a complete, self-contained unit which may be utilized in on-the-job locations.

Mounted at one corner of the platform 1 is a rotatable pedestal 7 suitably supporting a motor 8. The motor 8 drives a flexible shaft 9 having a grinding wheel 10 attached to the end thereof. Mounted at the other corner of the platform 1 is a vertical post 11 suitably supported in a vertical position by a brace 12. The post 11 is provided with openings 13 therethrough at spaced intervals, and may be supported, as shown, by the brace 12 and the platform 1 so as to be rotatable within such supports.

One end of a rigid bar 14 is connected by a pin 15 to a collar 16 which is rotatable and slidable on the post 11. A second collar 17, slidable on the post 11, is utilized to support the collar 16 at the desired position on the bar 14 by means of a pin 18 passing through one of the openings 13. With the construction as shown, the free end of the bar 14 may be swung both horizontally and vertically, while the other end thereof is adjustable along the length of the post 11. At the free end of the bar 14, a ground-engaging wheel 19 is provided for reasons that will become apparent as the description proceeds.

An arm 20 is slidably mounted on the bar 14 and is located in a selected position thereon by means of a pin 21 passing through a selected one of the openings 22 provided at spaced intervals in the bar 14. A second arm 23, similarly mounted on the bar 14, is located in a selected position thereon by a pin 24 passing through a selected opening 22. The arm 23 is preferably arcuately shaped to substantially encompass the tire sidewalls and tread in a plane passing through the tire axis when the apparatus is positioned to repair the tire as will be described hereinafter in greater detail. The arm 23 may be of a construction similar to that of the arm 20 in that the arm 23 may be of straight design rather than bent in an arcuate shape if repairs are to be limited to only those in the tread area.

Arms 20 and 23 are provided with openings 25 and 26, respectively. Various fittings, such as a guide block 27, may be suitably mounted in selected positions on the arm 20 by means thereon projecting into the openings 25.

A vulcanizing pad 28, such as is well known in the art, is attached to the arm 23 by means of a shank 29 extending into one of the openings 26. A hydraulic power jack 30 engages the shank 29 of the pad 28 in a manner to cause movement of the pad 28 to and from the arm 23. The jack 30 is actuated by fluid pressure from a pump 31 suitably mounted on the platform 1 and is connected thereto by a hose 32. It will be obvious to one skilled in the art that other means of imparting movement to the pad 28 relative to the arm 23 may be used such as electrical devices and mechanical linkages. The pad 28 may be electrically heated from any source of electrical energy and its temperature controlled by a combined rheostat and switch 33 mounted on the platform 1. Both the rheostat 33 and the buffer motor 8 may be supplied with power from a connection box 34 suitably mounted on the platform 1, and this box in turn supplied with power from any source, permanent or auxiliary thereto, by means of a power feeder line 35 and a plug-in connector 36.

A storage bracket 37 is provided as shown to receive the bar 14 and appurtenances attached thereto (shown in broken lines) during transit, thereby adding to the compactness of the equipment and simplifying preparations for the use thereof.

Figure 2:
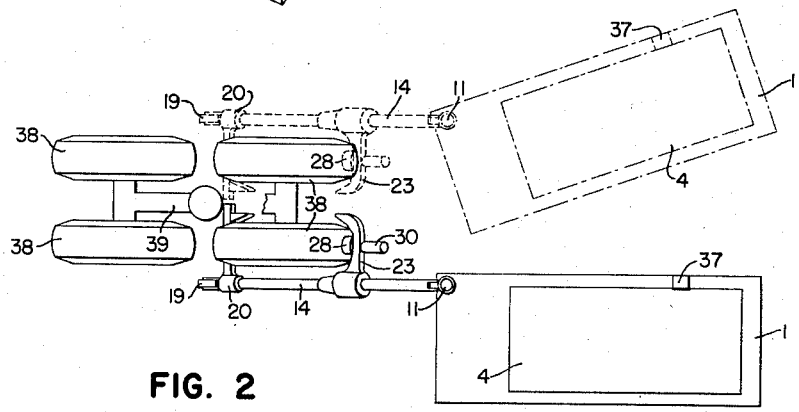
Fig. 2 is a plan view illustrating an application of the apparatus of the invention.
Figure 3:
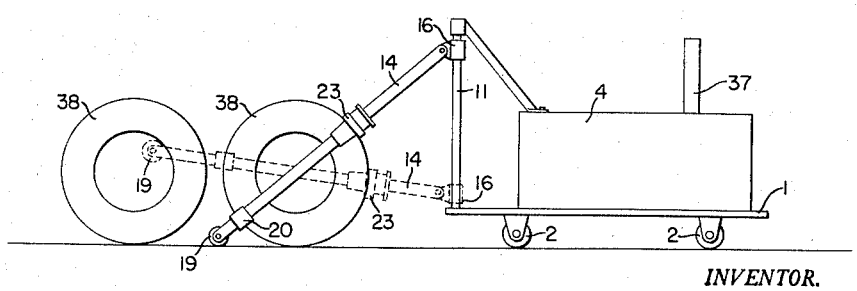
Fig. 3 is an elevation of the arrangement of Fig. 2.

Figs. 2 and 3 illustrate one use and operation of the apparatus of Fig. 1. Four tires 38 are shown mounted on a suitable carriage 39 in dual tandem arrangement such as is commonly encountered on many vehicles. The vehicle is moved to rotate the tire until the injury is in a position at which the pad 28 can be readily applied. As will now be evident, one advantage of the apparatus of the invention is that exact placement of the tire is not necessary, all needed adjustments being made by virtue of the sliding engagements of the various arms, the bar, the post, and the mobile platform of the apparatus. The bar 14 is then positioned substantially parallel to the plane of the tire and the arms 20 and 23 positioned as shown in Fig. 3.

The injury is prepared for vulcanization in a manner well-known in the art and when this is accomplished, the pad 28 is moved towards the arm 20 by the jack 30 and forcibly engages the area of injury on the tire. The presence of the arm 20 permits considerable pressure to be exerted by the pad 28 and prevents slippage thereof during repairs.

Reversal of the apparatus to operate in the position shown in Fig. 2 (broken outline) is easily accomplished by removal of the pin 15 (Fig. 1) and rotation of the bar 14 through 180 degrees or by rotating the arms 20 and 23 on the bar 14. In this manner any one of the tires 38 of Figs. 2 and 3 may be easily repaired rapidly and efficiently without removal from the vehicle. Furthermore, the repair is accomplished without contact of the apparatus with the metal wheel or rim which latter feature is important when such metal parts are formed of magnesium and similar sensitive metals. In Fig. 3, the bar 14 is also shown in the top and bottom positions (full and dotted lines respectively) to further illustrate the substantial tire surface easily accessible to the apparatus of the invention.

Figure 4:
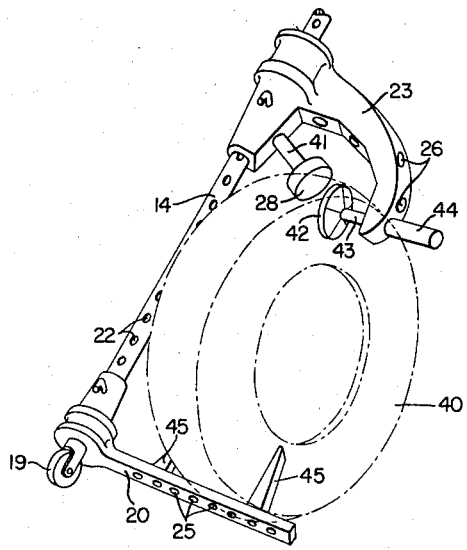
Fig. 4 is a fragmentary isometric view of an alternative position of the apparatus of Fig. 1.

In Fig. 4, another use of the apparatus of the invention is shown, namely, the repair of tire sidewalls. Assuming that the injury is on the furthermost side of a mounted tire 40, the vulcanizing pad 28 is suitably affixed to one end of the arcuately shaped arm 23 by means of a shank 41. Substantially opposed to the pad 28, as nearly as practicable, is a pressure plate 42 having a shank 43 connected to a hydraulic jack 44 or other suitable means for causing movement of the pressure plate 42 to and from the tire 40. To further position and retain the tire 40, two side extensions 45 are suitably mounted on the arm 21 and extend on opposite sides of the tire 40.

In operation, after the injury has been suitably prepared and is ready for vulcanization, the plate 42 is brought to bear against the tire 40 in a forceful manner thereby making for pressure contact between the tire and the vulcanizing pad 28. The arrangement of Fig. 4, like those previously discussed, is such that repairs may be effected over a wide range of positions and tire sizes. It will be apparent that the plate 42 may be stationary by providing suitable moving means for the pad 28.

In the case of a sidewall injury, the apparatus of Fig. 1 could be alternatively utilized by placing the bar 14 parallel to the axis of the wheel and the arm 20, without the block 27, on the side of the tire opposite the injury, with the arm 23 and the pad 28 on the injured side. It will be understood that the variations herein described are but a few of the many possibilities which will be apparent to one skilled in the art and which are inherent in the apparatus as a result of the considerable flexibility of adjustments provided therein.

A further example of one of the inherent advantages of the apparatus of the invention is the use thereof in the field under adverse conditions. Frequently, repairs must be made during low temperature weather conditions. To effectively make repairs the material in the area surrounding the injury should not be too cold. With the apparatus of the invention, the vulcanizing pad can be placed adjacent such injury and used to warm-up the repair area preparatory to applying patching materials, thus permitting repair under adverse conditions. Likewise, when the injury has been saturated with moisture, similar procedures can be used to dry the injury preparatory to repair.

While certain representative embodiments and details have been shown for the purpose of illustrating the invention, it will be apparent to those skilled in this art that various changes and modifications may be made therein without departing from the spirit or scope of the invention.

I claim:

1. Apparatus for repair of a tire by vulcanization while mounted on a vehicle comprising mobile supporting means, a member swingably connected to the supporting means, an arm mounted on the member, vulcanizing means mounted on the arm, and holding means opposed to the vulcanizing means to firmly clamp the mounted tire between the holding means and the opposing vulcanizing means.

2. Apparatus for repair of a tire by vulcanization while mounted on a vehicle comprising mobile supporting means, an elongated member swingably connected to the supporting means, a tire-engaging member mounted on the elongated member, an arm attached to the elongated member, vulcanizing means mounted on the arm and opposed to the tire-engaging member, and means to firmly clamp the mounted tire between the tire-engaging member and the opposed vulcanizing means.

3. Apparatus for repair of a tire by vulcanization while mounted on a vehicle comprising mobile supporting means, a rigid bar pivotally connected to the supporting means and adjustably mounted thereon, a tire-engaging member and a rigid arm mounted on said bar for relative movement to and from each other and each extending substantially normal to the length thereof, vulcanizing means adjustably mounted on said arm and opposed to the tire-engaging member, and means to controllably vary the distance between the tire-engaging member and the opposed vulcanizing means to firmly clamp the mounted tire therebetween.

4. Apparatus for repair of a tire by vulcanization while mounted on a vehicle comprising a mobile base, a post mounted on and extending from the base, a rigid bar pivotally connected to the post and adjustable along the length thereof, a tire-engaging member and a rigid arm mounted on said bar for relative movement to and from each other and extending substantially normal to the length thereof, vulcanizing means adjustably mounted on said arm and opposed to the tire-engaging member, and means to controllably vary the distance between the tire-engaging member and the opposed vulcanizing means to firmly clamp the mounted tire therebetween.

5. Apparatus for repair of a tire by vulcanization while mounted on a vehicle comprising a platform, means associated with the platform to impart mobility thereto, a post mounted on and extending from the platform, a rigid bar pivotally connected to the post and adjustable along the length thereof, a tire-engaging member and an arm mounted on said bar for relative movement to and from each other and extending substantially normal to the length thereof, vulcanizing means adjustably mounted on said arm and opposed to the tire-engaging member, and means to controllably vary the distance between the tire-engaging member and the opposed vulcanizing means to firmly clamp the mounted tire therebetween.

6. Apparatus for repair of a tire by vulcanization while mounted on a vehicle comprising a mobile horizontal platform, a post pivotably mounted on and extending vertically above the platform, a rigid bar, connecting means between one terminus of the bar and the post, adjusting means associated with the connecting means to effect placement of the juncture between the bar terminus and the post at any position intermediate the post length, a first and a second arm slidingly engaging the rigid bar and extending substantially normal to the length thereof, means for rigidly affixing the first and the second arms to the rigid bar at any position intermediate the length of the bar, vulcanizing means adjustably mounted on the second arm and opposed to the first arm, and means to controllably vary the distance between the first arm and the opposed vulcanizing means to firmly clamp the mounted tire therebetween.

7. Apparatus for repair of a tire by vulcanization while mounted on a vehicle comprising a horizontal platform, means associated with the platform to impart mobility thereto, a post pivotably mounted on and extending vertically above the upper surface of the platform, a rigid bar, connecting means between one terminus of the bar and the post, adjusting means associated with the connecting means to effect placement of the juncture between the bar terminus and the post at any position intermediate the post length, a first and a second arm slidingly engaging the rigid bar and extending substantially normal to the length thereof, means for rigidly affixing the first and the second arms to the rigid bar at any position intermediate the length of the bar, vulcanizing means adjustably mounted on the second arm and opposed to the first arm, and means to controllably vary the distance between the first arm and the opposed vulcanizing means to firmly clamp the mounted tire therebetween.

8. Apparatus for repair of a tire by vulcanization while mounted on a vehicle comprising mobile supporting means, an elongated member swingably connected to the supporting means, an arm mounted on the elongated member and arcuately shaped to substantially encompass the tire sidewalls and tread in a plane passing through the tire axis, vulcanizing means mounted on the arm, and clamping means mounted on the arm substantially opposed to the vulcanizing means to firmly clamp the mounted tire between the clamping means and the opposed vulcanizing means.

9. Apparatus for repair of a tire by vulcanizing while mounted on a vehicle comprising mobile supporting means, a rigid bar pivotally connected to the supporting means and adjustably mounted thereon, a tire-engaging member, a rigid arm arcuately shaped to substantially encompass the tire sidewalls and tread in a plane passing through the tire axis, said member and arm mounted on the bar for relative movement to and from each other and extending substantially normal to the length thereof, vulcanizing means adjustably mounted on the arm, and clamping means adjustably mounted on the arm substantially opposed to the vulcanizing means to firmly clamp the mounted tire between the clamping means, the opposed vulcanizing means, and the tire-engaging member.

10. Apparatus for repair of a tire by vulcanizing while mounted on a vehicle comprising mobile supporting means, a rigid bar pivotally connected to the supporting means and adjustably mounted thereon, a tire-engaging member, a rigid arm arcuately shaped to substantially encompass the tire sidewalls and tread in a plane passing through the tire axis, said member and arm mounted on the bar for relative movement to and from each other and extending substantially normal to the length thereof, vulcanizing means adjustably mounted on the arm, holding means adjustably mounted on the arm substantially opposed to the vulcanizing means, means to controllably vary the distance between the holding means, the tire-engaging member, and the vulcanizing means to firmly clamp the mounted tire therebetween.

11. Apparatus for repair of a tire by vulcanization while mounted on a vehicle comprising a mobile base, a post mounted on and extending from the base, a rigid bar pivotally connected to the post and adjustable along the length thereof, a tire-engaging member, a rigid arm arcuately shaped to substantially encompass the tire sidewalls and tread in a plane passing through the tire axis, said member and arm mounted on the bar for relative movement to and from each other and extending substantially normal to the length thereof, vulcanizing means adjustably mounted on the arm, holding means adjustably mounted on the arm substantially opposed to the vulcanizing means, means to controllably vary the distance between the holding means, the tire-engaging member, and the vulcanizing means to firmly clamp the mounted tire therebetween.

12. Apparatus for repair of a tire by vulcanization while mounted on a vehicle comprising a horizontal platform, means associated with the platform to impart mobility thereto, a post pivotably mounted on and extending vertically above the upper surface of the platform, a rigid bar pivotally connected to the post and adjustable along the length thereof, a tire-engaging member, a rigid arm arcuately bent to encompass the tire sidewalls and tread in a plane passing through the tire axis, said member and arm mounted on the bar for relative movement to and from each other and extending substantially normal from the length thereof, vulcanizing means adjustably mounted on the arm, holding means adjustably mounted on the arm substantially opposed to the vulcanizing means, means to controllably vary the distance between the holding means, the tire-engaging member, and the vulcanizing means to firmly clamp the mounted tire therebetween.

13. An apparatus for repair of a tire by vulcanization while mounted on a vehicle comprising a mobile vehicle, an arm swingably mounted on and entirely supported by said vehicle and movable from an inoperative position thereon to a selected operative position extending from the vehicle, and tire vulcanizing means carried by and adjustable along said arm, whereby the vehicle can be moved to the tire to be repaired and the arm swung into a position adjacent the tire with the vulcanizing means in position to engage and vulcanize the same.

14. Tire repair apparatus as claimed in claim 13 in which the arm is provided with means cooperating with the vulcanizing means to retain the latter in pressure engagement with the tire.

References Cited in the file of this patent

UNITED STATES PATENTS

| | | |
|---|---|---|
| 1,140,381 | Lowoll | May 25, 1915 |
| 2,370,241 | Heintz | Feb. 27, 1945 |
| 2,421,100 | Lokso | May 27, 1947 |
| 2,479,229 | Goodman | Aug. 16, 1949 |

FOREIGN PATENTS

| | | |
|---|---|---|
| 610,734 | Great Britain | Oct. 20, 1948 |